(12) United States Patent
Gunji

(10) Patent No.: US 7,173,396 B2
(45) Date of Patent: Feb. 6, 2007

(54) HYBRID ELECTRIC VEHICLE WITH ENHANCED BATTERY CONTROL

(75) Inventor: Kenichirou Gunji, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 487 days.

(21) Appl. No.: 10/237,620

(22) Filed: Sep. 10, 2002

(65) Prior Publication Data

US 2003/0052650 A1    Mar. 20, 2003

(30) Foreign Application Priority Data

Sep. 18, 2001  (JP) ............................. 2001-283805

(51) Int. Cl.
  *H01M 10/44* (2006.01)
  *H01M 10/46* (2006.01)

(52) U.S. Cl. .................................................. 320/132

(58) Field of Classification Search ................ 320/104, 320/128, 132, 130, 136, 134, 127, 162; 180/65.3, 180/65.5, 65.2, 65.1
See application file for complete search history.

(56) References Cited

U.S. PATENT DOCUMENTS

| | | | |
|---|---|---|---|
| 5,343,970 A * | 9/1994 | Severinsky | 180/65.2 |
| 5,487,002 A * | 1/1996 | Diller et al. | 701/1 |
| 6,127,813 A | 10/2000 | Tamagawa | 322/16 |
| 6,204,636 B1 * | 3/2001 | Kinoshita et al. | 320/134 |
| 6,285,163 B1 * | 9/2001 | Watanabe et al. | 320/132 |
| 6,424,157 B1 * | 7/2002 | Gollomp et al. | 324/430 |
| 6,453,249 B1 * | 9/2002 | Shibutani et al. | 702/63 |
| 2001/0024104 A1 | 9/2001 | Suzuki | 320/104 |
| 2001/0035740 A1 * | 11/2001 | Palanisamy | 320/147 |

FOREIGN PATENT DOCUMENTS

| | | |
|---|---|---|
| JP | 11-164402 | 6/1999 |
| JP | 2000-012105 A | 1/2000 |
| JP | 2001-238306 A | 8/2001 |

\* cited by examiner

*Primary Examiner*—Edward H. Tso
(74) *Attorney, Agent, or Firm*—Foley & Lardner LLP

(57) ABSTRACT

A method and system for enhanced battery control improves the performance of a hybrid electric vehicle (HEV). The HEV includes an internal combustion engine, at least one motor operable as a generator and a battery. A hybrid control module determines various discharge and recharge allowances limiting operation of the battery with different operating conditions of the hybrid electric vehicle. It also determines various periods of time limiting operation of the battery with different operating conditions of the hybrid electric vehicle. The allowances and periods of time may be used as limits that are imposed on commands for the motor.

20 Claims, 9 Drawing Sheets

DISCHARGE

| REQUEST FOR | MARGIN $MG_O$ | PERIOD OF TIME tp |
|---|---|---|
| TORQUE ASSIST BY MOTOR | MAX. | 5sec |
| MOTOR RUNNING (CREEP START) | MAX. | 5sec |
| 4WD START | INT. | 3sec |
| ENGINE START | MIN. | 1sec |
| 4WD (SLIP) | MIN. | 1sec |
| DUET CONTROL (SHIFT DOWN) | MIN. | 1sec |
| MOTOR ACTION FOR ROLL-BACK AVOIDANCE | MIN. | 1sec |

RECHARGE

| REQUEST FOR | MARGIN MG$_I$ | PERIOD OF TIME tp |
|---|---|---|
| ENGINE BRAKE ASSIST | MAX. | 5sec |
| TORQUE ABSORPTION AT ENGINE START | MIN. | 1sec |
| MOTOR TCS | MIN. | 1sec |
| DUET CONTROL (SHIFT UP) | MIN. | 1sec |
| MOTOR ACTION FOR ROLL-BACK AVOIDANCE | MIN. | 1sec |

HYBRID ELECTRIC VEHICLE WITH ENHANCED BATTERY CONTROL

BACKGROUND OF THE INVENTION

1. Field of the Invention

The present invention relates to hybrid electric vehicles, that is, vehicles in which both an internal combustion engine and at least one motor are provided to supply driving torque, a battery is provided to supply electrical energy to the motor, the motor is operable as a generator to receive torque to recharge the battery. More particularly, the present invention relates to a method and system for enhanced battery control that improves the performance of a hybrid electric vehicle.

2. Description of the Background Art

Hybrid electric vehicles have a battery and at least one motor that are operable as a generator. The battery operates in various modes, including discharge mode and recharge mode. In discharge mode, the battery is discharged to power a motor. In recharge mode, the motor is operable as a generator and receives torque from an internal combustion engine or road wheels to recharge the battery. Various measures of battery control have been proposed to improve performance of hybrid electric vehicles. One example of such measures is found in JP-A 11-164402 published Jun. 18, 1999. According to the conventional implementation, a controller predicts what will be requested on a battery in future based on operating condition of the vehicle, and raises or lowers SOC of the battery to meet various requests predicted.

While it can properly manage a battery of a hybrid electric vehicle to some extent, the conventional implementation does not have sufficient capability of being responsive to variations of electrical power during operation in discharge and recharge modes. According to the conventional implementation, a predetermined margin is set to fix a portion of capability of a battery usable for operation in discharge and recharge modes. If the margin is set to keep variations in SOC with an appropriate range, the conventional implementation has limited capability of supplying electrical power great enough to drive a motor when a great driving force is requested over a short period of time. Further, it has limited capability of receiving a great electrical power to raise SOC to a satisfactorily high level during operation in recharge mode. If the margin is set to a smaller value to permit a sufficiently great magnitude of electrical current during operation in discharge and recharge modes to meet the above-mentioned requests, it is difficult to keep variations in SOC within the appropriate range due to an excess magnitude of electrical current discharged from or recharged to the battery over the overall operating conditions of the hybrid electric vehicle.

It is thus seen to be desirable to enhance battery control to improve the performance of a hybrid electric vehicle.

SUMMARY OF THE INVENTION

An object of the present invention is to provide a method and system for enhanced battery control that improves the performance of a hybrid electric vehicle.

In one exemplary implementation of the present invention, there is provided a system for enhanced battery control that improves the performance of a hybrid electric vehicle, the hybrid electric vehicle includes an internal combustion engine, at least one motor operable as a generator and a battery, the system comprising:

a block determining various discharge and recharge allowances limiting operation of the battery with different operating conditions of the hybrid electric vehicle; and a block determining various periods of time limiting operation of the battery with different operating conditions of the hybrid electric vehicle.

BRIEF DESCRIPTION OF THE DRAWINGS

Further objects and advantages of the invention will be apparent from reading of the following description in conjunction with the accompanying drawings.

DETAILED DESCRIPTION OF THE INVENTION

Figure 1:
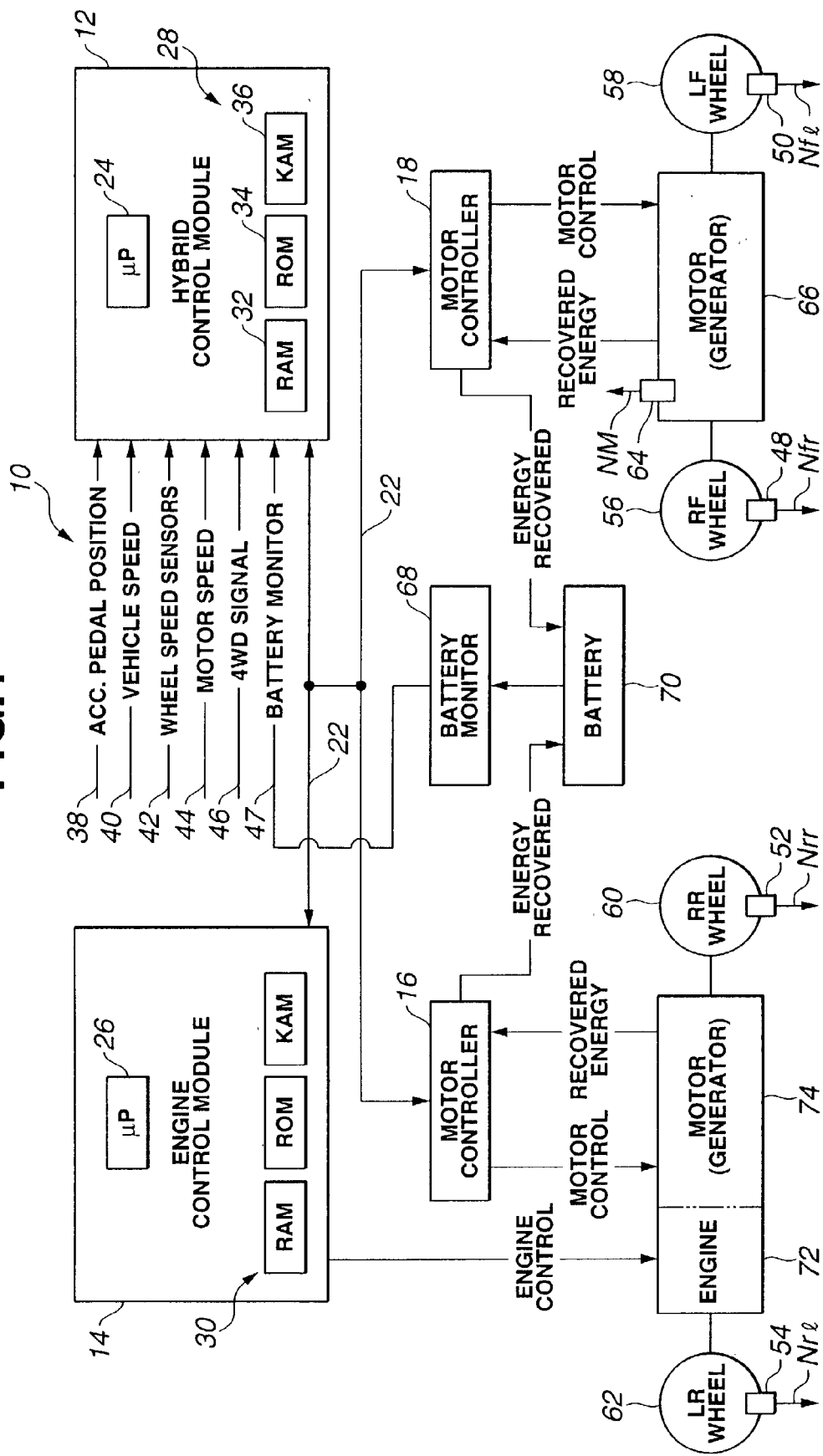
FIG. 1 is a block diagram illustrating a control system for a hybrid electric vehicle.

Referring now to the accompanying drawings, FIG. 1 shows a hybrid electric vehicle (HEV) 10 according to the present invention. HEV 10 includes a hybrid control module (HCM) 12 in communication with an engine control module (ECM) 14, a first motor controller (MC) 16 and a second motor controller (MC) 18 via an appropriate communication link 22. Communication link 22 preferably conforms to an intra-controller bus standard, but is at least capable of exchanging information and commands relative to current operating conditions and control of the vehicle.

In one exemplary embodiment of the present invention, HCM and ECM 12 and 14 comprise microprocessor-based controllers with associated microprocessors 24 and 26, respectively. Microprocessors 24 and 26 communicate with associated computer-readable storage media 28 and 30, respectively. As will be appreciable by one of ordinary skill in the art, computer-readable storage media may include various devices for storing data representing instructions executable by the microprocessor to control HEV 10. For example, computer-readable storage media may include a random access memory (RAM) 32, a read-only memory (ROM) 34, and/or a keep-alive memory (KAM) 36. These functions may be performed through any one of a number of known physical devices including EPROM, EEPROM, flash memory, and the like. The present invention is not limited to a particular type of computer-readable storage medium, examples of which are provided for convenience of description only.

HCM 12 is used to effect control logic implemented in terms of software (instructions) and/or hardware components. Additional details of control logic implemented by HCM 12 according to the present invention are provided with reference to FIG. 2 or FIGS. 8 to 11.

HCM 12 receives various signals from sensors to monitor current operating conditions of HEV 10. For example, signals may include an accelerator pedal position signal 38, a vehicle speed signal 40, wheel speed sensor signals 42, a motor speed signal 44, a 4WD signal 46 and battery monitor signals 47. HCM 12 may be in direct communication with associated sensors, switches, and other input devices.

In one embodiment of the present invention, wheel speed signals 42 correspond to signals provided by corresponding wheel speed sensors 48, 50, 52 and 54 associated with corresponding road wheels 56, 58, 60 and 62, respectively. Motor speed signal 44 corresponds to a signal provided by a motor speed sensor 64 positioned to monitor rotation speed of an electrical motor 66. Battery monitor signals 47 correspond to signals, including a voltage signal and a current signal, provided by a battery monitor 68 positioned to monitor a storage battery 70.

Motor 66 is drivingly coupled with a first set of road wheels 56 and 58. Motor 66 is electrically coupled to storage battery 70. Under control provided MC 18, motor 66 receives energy from battery 70 to apply a driving torque to road wheels 56 and 58. Motor 66 is operable as a generator and receives kinetic energy from road wheels 56 and 58 to apply electrical energy to battery 70 to recharge it. MC 18 receives various commands from HCM 12 and regulates electrical power supplied to or from motor/generator 66.

As mentioned before, HCM 12 communicates with ECM 14 via communication link 22. As a part of engine control, ECM 14 applies an engine torque command to an internal combustion engine 72. Engine 72 is drivingly coupled with a second set of road wheels 60 and 62 to apply a driving torque to them. Engine 72 is drivingly coupled with an electrical motor 74. Thus, motor 74 is drivingly coupled with road wheels 60 and 62, too.

Motor 74 is electrically coupled to battery 70. Under control provided MC 16, motor 74 receives energy from battery 70 to apply a driving torque to road wheels 60 and 62. Motor 74 is operable as a generator and receives kinetic energy from road wheels 60 and 62 or engine 72 to apply electrical energy to battery 70 to recharge it. MC 16 receives various commands from HCM 12 and regulates electrical power supplied to or from motor/generator 72.

Figure 2:
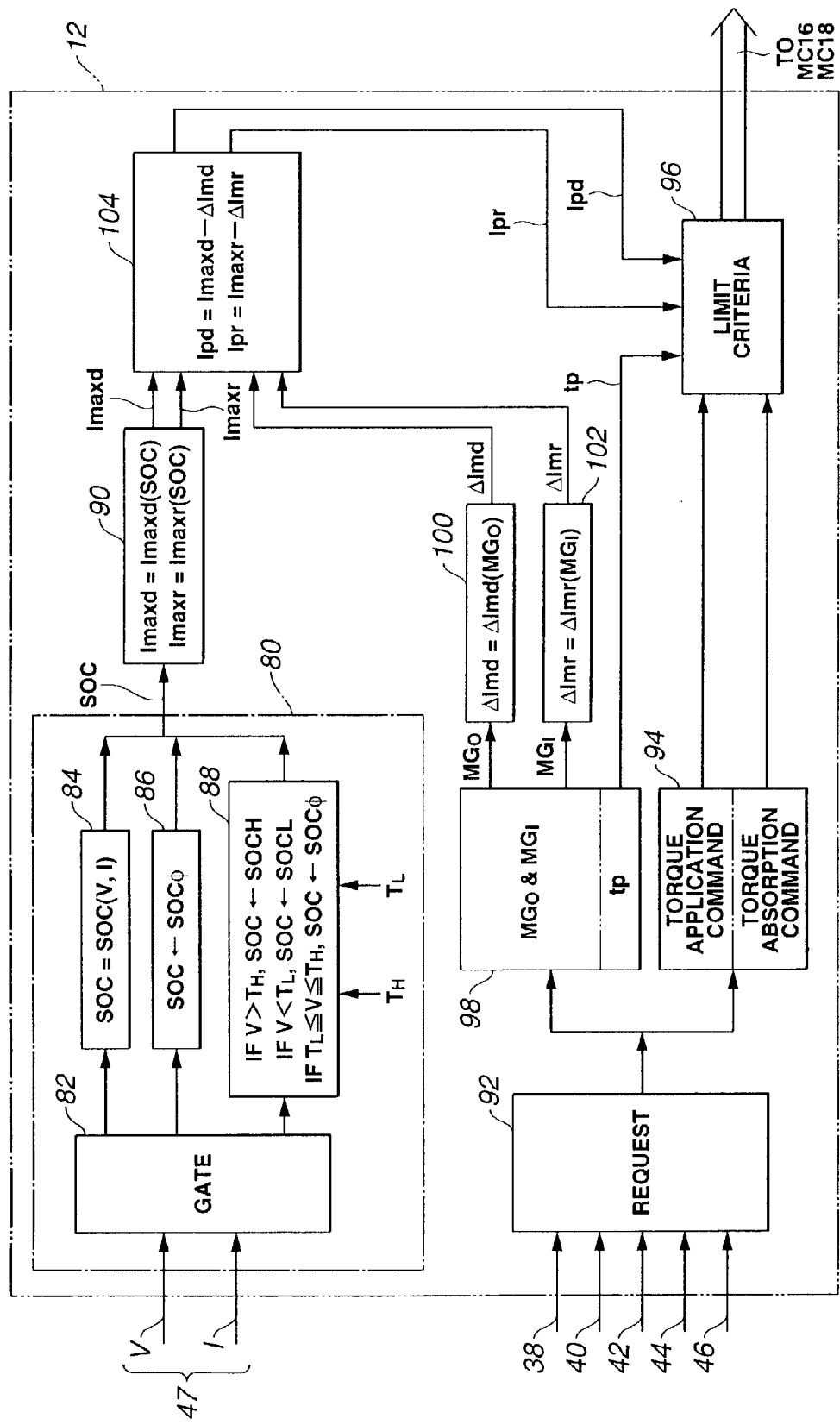
FIG. 2 is a flow diagram showing enhanced battery control implementing the present invention.

With reference to FIG. 2, in one embodiment, HCM 12 establishes limit criteria of torque application or absorption command provided to MC 16 or MC 18 to implement enhanced battery control. FIG. 2 is control diagram showing control of motors 16 and 18. In FIG. 2, the battery monitor signals 47 correspond to a voltage signal V and a current signal I provided by a voltage sensor and a current sensor positioned to monitor battery 70, respectively. The voltage sensor is positioned to monitor a battery open-end voltage.

HCM 12 includes an actual SOC estimating block 80. Voltage and current signals V and I are used as inputs of a gate block 82. At gate block 82, it is determined based on variations of the sensor signals V and I whether or not the voltage and current sensors are out of order.

If both voltage and current sensors are in good order, voltage and current signals V and I are used in calculation of an actual SOC at block 84. At block 84, an actual SOC is calculated after decreasing, by the amount of discharge, and/or increasing, by the amount of recharge, an initial value of SOC. The initial value of SOC is determined from the output of voltage sensor when a relay disconnects battery 70 from a power supply circuit. The output of current sensor is used to determine the amount of discharge and the amount of recharge.

If both voltage and current sensors are out of order, such calculation at block 84 is no longer possible. Under this condition, an actual SOC is set to a predetermined base level SOC0 at block 86.

If the current sensor is out of order, but the voltage sensor is in good order, the output of voltage sensor is compared, at block 88, to a predetermined high voltage threshold $T_H$ and a predetermined low voltage threshold $T_L$. If voltage V is greater than the high voltage threshold $T_H$, an actual SOC is set to a predetermined high level SOCH. If voltage V is less than the low voltage threshold $T_L$, an actual SOC is set to a predetermined low level SOCL. If voltage V is not greater than $T_H$ and not less than $T_L$, an actual SOC is set to the base level SOC0. The relationship between the three levels is such that SOCH>SOC0>SOCL. SOC estimating block 80 generates the actual SOC indicative of the available output of blocks 84, 86 and 88.

The actual SOC is used as an input of a a discharge and recharge limits calculating block 90. At block 90, the actual SOC is used to determine a discharge limit and a recharge limit. The discharge limit is expressed in terms of a maximum magnitude of discharge current $I_{maxd}$ useable in discharge mode. The charge limit is expressed in terms of a maximum magnitude of recharge current $I_{maxr}$ usable in recharge mode. At block 90, the maximum magnitudes of current $I_{maxd}$ and $I_{maxr}$ are determined from the actual SOC. For example, a lookup table is used, which contains varying of $I_{maxd}$ with different levels of SOC, and another lookup table is used, which contains varying of $I_{maxr}$ with different levels of SOC. Block 90 outputs the determined maximum magnitudes of discharge and recharge current $I_{maxd}$ and $I_{maxr}$.

Signals 38, 40, 42, 44 and 46 are used as inputs of a logic block 92 implementing a control strategy governing selection of an appropriate one of a number of stored requests for torque application or absorption by MC 16 or MC 18. In the embodiment, seven (7) requests are stored for torque application by motor, and five (5) requests are stored for torque absorption by motor operating as a generator.

The seven (7) requests for torque application by motor are as follows:

(1) Request for torque assist by motor:

When a torque assist is needed for rapid acceleration, this request is selected, causing MC 16 to discharge battery 70 to energize motor 74. When energized, motor 74 applies a driving torque to road wheels 60 and 62 in addition to driving torque provided by engine 72.

(2) Request for motor running (creep):

When motor creep torque is demanded at vehicle start, this request is selected, causing MC 16 to energize motor 74 by controlling discharge of battery 70.

(3) Request for 4WD start:

When operator demands vehicle start in 4WD mode, this request is selected. The vehicle start in 4WD mode is accomplished by causing MC 18 to energize motor 66 by controlling discharge of battery 70. When energized, motor 66 applies a driving torque to road wheels 56 and 58 in coordination to a driving torque applied by engine 72 to road wheels 60 and 62.

(4) Request for engine start:

At start, this request is selected, causing MC 16 to energize motor 74 for cranking engine 72.

(5) Request for 4WD (slip):

Upon detection of a slip from sensed wheel speeds $N_{fr}$, $N_{fl}$, $N_{rr}$ and $N_{rl}$, this request is selected, causing MC 18 to energize motor 66 by controlling discharge of battery 70.

(6) Request for duet control (shift down):

Upon detection of a shift down of the associated transmission following engine 72, this request is selected, causing MC 16 to energize motor 74 to increase speed of the engine output shaft to match that of the transmission output shaft. This control is effective in suppressing the shift shocks.

(7) Request for motor action for roll-back avoidance:

Upon detection that vehicle is subject to roll-back on an uphill road when vehicle start by motor torque is demanded, this request is selected, causing MC 16 to energize motor 74 by controlling discharge of battery 70.

The five (5) requests for torque absorption by operating motor as generator are as follows:

(1) Request for engine brake assist:

When regenerative braking is needed, this request is selected, causing MC 16 to operate motor 74 as a generator. Under this condition, electrical energy may be used to recharge battery 70.

(2) Request for torque absorption at engine start:

When there is surplus output torque immediately after engine start, this request is selected, causing MC 16 to operate motor 74 as a generator. Under this condition, electrical energy may be used to recharge battery 70.

(3) Request for motor TCS:

Upon detection of slip, this request is selected as a part of a traction control system (TCS). When this request is selected, MC 16 operates motor 74 as a generator. Under this condition, electrical energy may be used to recharge battery 70.

(4) Request for duet control (shift up):

Upon detection of a shift up of the associated transmission following engine 72, this request is selected, causing MC 16 to operate motor 74 as a generator to decrease speed of the engine output shaft to match that of the transmission output shaft. Under this condition, electrical energy may be used to recharge battery 70.

(5) Request for motor action for roll-back avoidance:

Upon detection that vehicle is subject to roll-back on a downhill road when vehicle start by motor is demanded, this request is selected, causing MC 16 to operate motor 74 as a generator. Under this condition, electrical energy may be used to recharge battery 70.

With continuing reference to FIG. 2, block 92 selects one of the above-mentioned requests in response to operating condition and generates, as an output, a request signal indicative of the selected request.

The request signal from request selecting block 92 is used as an input of a torque application and/or absorption command generator 94. At block 94, a torque application command or a torque absorption command is generated in response to the selected request indicated by the request signal. Torque application commands generated in response to the above-mentioned requests (1), (2), (4), (6) and (7) for torque application are used to cause MC 16 to energize motor 74. Torque application commands generated in response to the above-mentioned requests (3) and (5) for torque application are used to cause MC 18 to energize motor 66. Torque absorption commands generated in response to the above-mentioned requests (1), (2), (3), (4) and (5) for torque absorption are used to cause MC 16 to operate motor 74 as a generator. In one embodiment, the torque application commands contain information as to the magnitude of current to be discharged by battery 70 to energize motor 74 or 66 for regulating torque applied. In the embodiment, the torque absorption commands contain information as to the magnitude of current to be generated by generator 74 to recharge battery 70 for regulating torque absorbed.

Command generator 94 provides the torque application or absorption command to a block 96. The function of block 96 will be described later.

Figures 3, 4:
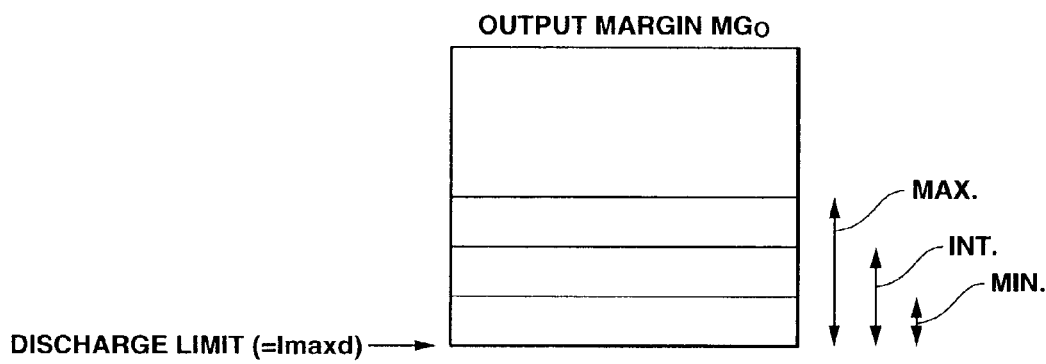
FIG. 3 illustrates a stored lookup table used to set output margin ($MG_O$) and period of time (tp).
FIG. 4 is a view illustrating the relationship between discharge limit ($=I_{maxd}$) and three levels of output margin ($MG_O$).
Figures 5, 6:
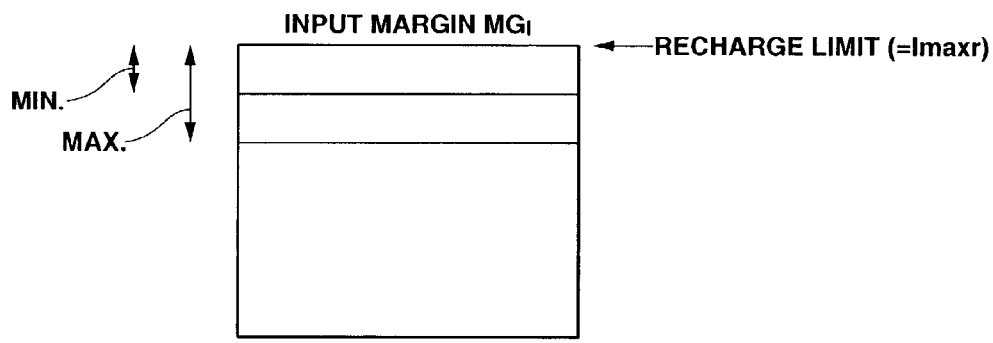
FIG. 5 illustrates a stored lookup table used to set input margin ($MG_I$) and period of time (tp).
FIG. 6 is a view illustrating the relationship between recharge limit ($=I_{maxr}$) and two levels of input margin ($MG_I$).

The request signal from request selecting block 92 is used as an input of a margin and time determining block 98. At block 98, the selected request is used to determine an output/input margin $MG_O$ or $MG_I$ and a period of time $t_p$ using stored lookup tables illustrated in FIGS. 3 and 5. As illustrated in FIG. 4, the output margin $MG_O$ is a difference between the discharge limit and an upper limit of different magnitudes of discharge current allowed for battery 70 to discharge in discharge mode. As illustrated in FIG. 6, the input margin $MG_I$ is a difference between the recharge limit and an upper limit of different magnitudes of recharge current allowed for battery 70 to receive in recharge mode.

Under a condition when both voltage and current sensors are out of order, the output and input margins $MG_O$ and $MG_I$ must be set to the maximum level and the period of time $t_p$ must be set to the minimum for limiting operation of battery 70.

Under a condition when, although the current sensor is out of order, the voltage sensor is in good order and the output of voltage sensor is greater than the predetermined high voltage threshold $T_H$, the input margin $MG_I$, must be set to the maximum level and the period of time $t_p$ must be set to the minimum Under a condition when, although the current sensor is out of order, the voltage sensor is in good order and the output of voltage sensor is less than the predetermined low voltage threshold $T_L$, the output margin $MG_O$ must be set to the maximum level and the period of time $t_p$ must be set to the minimum.

Block 98 provides the determined output and input margins $MG_O$ and $MG_I$ to blocks 100 and 102. Block 98 provides the determined period of time $t_p$ to block 96.

At block 100, a discharge clearance $\Delta I_{md}$ is determined as a function of output margin $MG_O$. Discharge clearance $\Delta I_{md}$ is a clearance to the maximum magnitude of discharge current $I_{maxd}$ that is determined at block 90. At block 102, a recharge clearance $\Delta I_{mr}$ is determined as a function of input margin $MG_I$. Recharge clearance $\Delta I_{mr}$ is a clearance to the maximum magnitude of recharge current $I_{maxr}$ that is determined at block 90. The functional relationship between discharge clearance $\Delta I_{md}$ and output margin $MG_O$ is a proportional relationship. The functional relationship between recharge clearance $\Delta I_{mr}$ and input margin $MG_I$ is a proportional relationship.

Blocks 100 and 102 output discharge and recharge clearances $\Delta I_{md}$ and $\Delta I_{mr}$. Discharge and recharge clearances $\Delta I_{md}$ and $\Delta I_{mr}$ are used as inputs of a block 104. The maximum magnitudes of discharge and recharge current $I_{maxd}$ and $I_{maxr}$ that are determined at block 90 are used as other inputs of block 104.

At block 104, a discharge allowance $I_{pd}$ and a recharge allowance $I_{pr}$ are determined. Discharge and recharge allowances $I_{pd}$ and $I_{pr}$ are expressed as:

$$I_{pd}=I_{maxd}-\Delta I_{md} \qquad (1),$$

and $$I_{pr}=I_{maxr}-\Delta I_{mr} \qquad (2).$$

Block 104 provides the determined discharge and recharge allowances $I_{pd}$ and $I_{pr}$ to block 96.

At block 96, the torque application and/or absorption command from block 94 are limited and then applied to MC 16 or 18. Specifically, discharge allowance $I_{pd}$ and period of time $t_p$ are used as limits that are imposed on the torque application command, while recharge allowance $I_{pr}$ and period of time $t_p$ are used as limits that are imposed on the torque absorption command.

Turning back to FIG. 1, in applications where ECM 14 controls an internal combustion engine that drives front road wheels of a vehicle, the second set of road wheels 60 and 62 are a pair of front road wheels and the first set of road wheels 56 and 58 are a pair of rear road wheels. In applications where controller ECM 14 controls an internal combustion engine that drives rear road wheels of a vehicle, the second set of road wheels 60 and 62 are a pair of rear road wheels and the first set of road wheels 56 and 58 are a pair of front road wheels.

Figure 7:
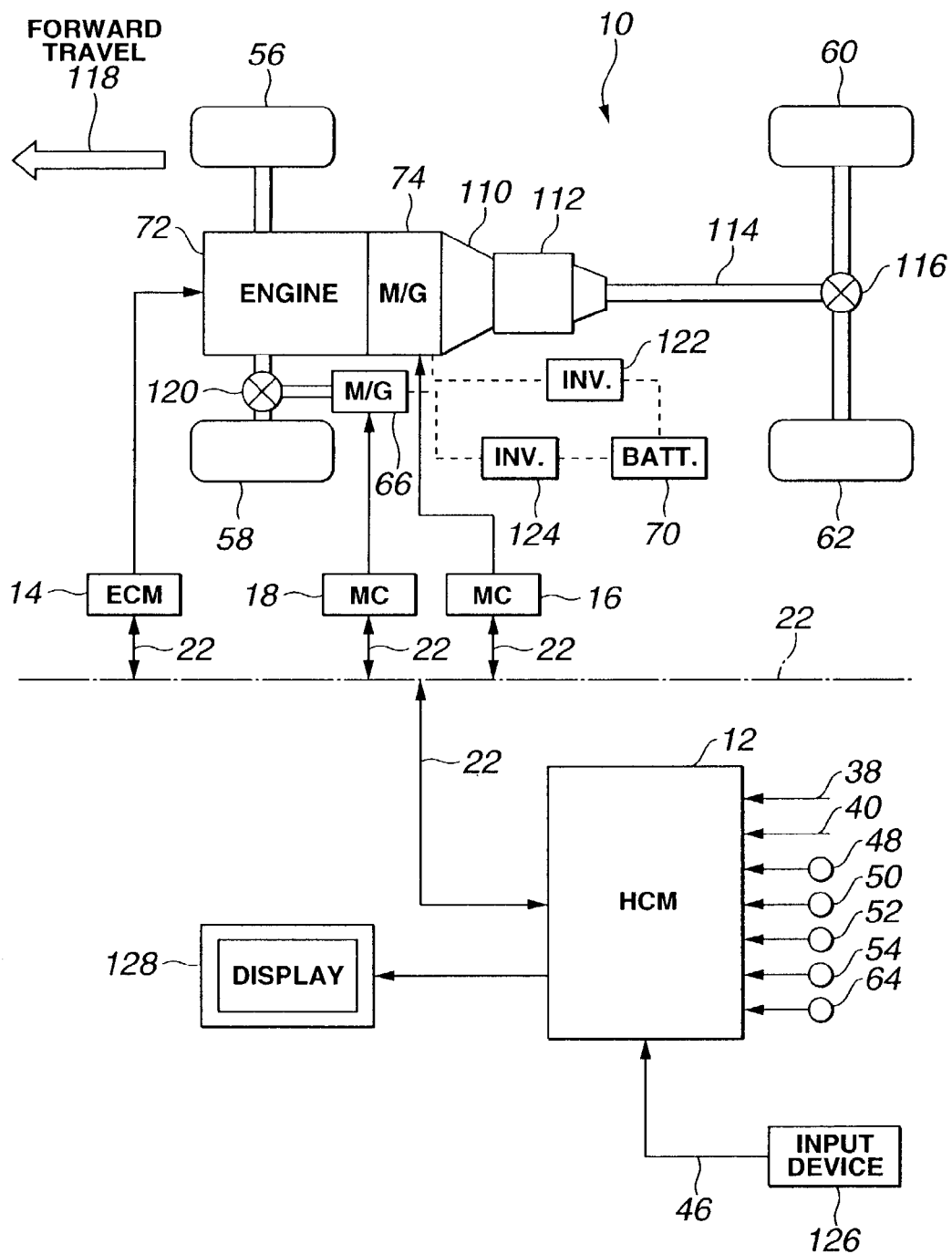
FIG. 7 is a block diagram showing the relationship between a power train of a hybrid electric vehicle, a hybrid control module, an engine control module and motor controllers.

With reference now to FIG. 7, in one exemplary embodiment of the present invention, the first set of road wheels are a right front road wheel 56 and a left front road wheel 58, and the second set of road wheels are a right rear road wheel 60 and a left rear road wheel 62. In the embodiment, an internal combustion engine 72 outputs its power through the engine output shaft, with which a motor/generator 74 is directly coupled. Motor/generator 74 may be indirectly coupled with the engine output shaft via a power transmission member such as a belt or a chain. The engine output shaft is connected to a pump shaft of a torque converter 110, which has a turbine shaft connected to an input shaft of a transmission 112. The transmission 112 transfers the engine power to the transmission output shaft. The transmission output shaft transfers via a drive shaft 114 the engine power to a final drive, which includes a differential 116. The final drive moves a HEV 10 in a forward direction as indicated by an arrow 118 by rotating rear road wheels 60 and 62.

In the embodiment, a motor/generator 66 outputs its power through the motor output shaft. The motor output shaft is connected via a reduction gearing, not shown, to a final drive, which includes a differential 120. This final drive moves the HEV 10 by rotating front road wheels 56 and 58.

In the embodiment, a battery 70 is in the form of a battery with a voltage exceeding 100 V. Battery 48 supplies electrical power through an inverter 122 to motor 74. Battery 70 supplies electrical power through another inverter 124 to motor 66. Motor 74 is operable as a generator and supplies electrical power through inverter 122 to battery 70. A HCM 12 controls, via MCs 16 and 18, supply of electrical power through inverters 122 and 124. Via communication link 22, HCM 12, MCs 16 and 18 and ECM 14 are interconnected.

The embodiment illustrated in FIG. 7 is substantially the same as the previously described embodiments except the provision of a manually operable input device 126 and a display 128. Both input device 126 and display 128 are disposed within a passenger compartment of HEV 10. Input device 126 is manually operable to provide 4WD signal 46 to HCM 12. Display 128 is used, as a monitor, to provide information as to operating condition of HEV 10 and state of battery 70. Display 128 is coupled to HEV 12 to receive such information.

An example of how HCM 12 would implement the present invention can be understood with reference to FIGS. 8–11. The flow diagram in FIGS. 8–11 illustrates a control routine 200 of an exemplary implementation of the present invention. As will be appreciated by one of ordinary skill in the art, the illustrated flow diagram may represent any of a number of known processing strategies such as event-driven, interrupt-driven, multi-tasking, multi-treating, and the like. As such, various steps or functions illustrated may be performed in the sequence illustrated, or in parallel. The order of processing is provided for ease of illustration and description, only. Preferably, the control logic is implemented in software, which is executed by a microprocessor-based controller. Of course, the control logic may be implemented in software, hardware, or a combination of software and hardware. The flow diagram of FIGS. 8–11 illustrates one "loop" and its operations are preferably repeated at predetermined time intervals as known by those skilled in the art.

Figure 8:
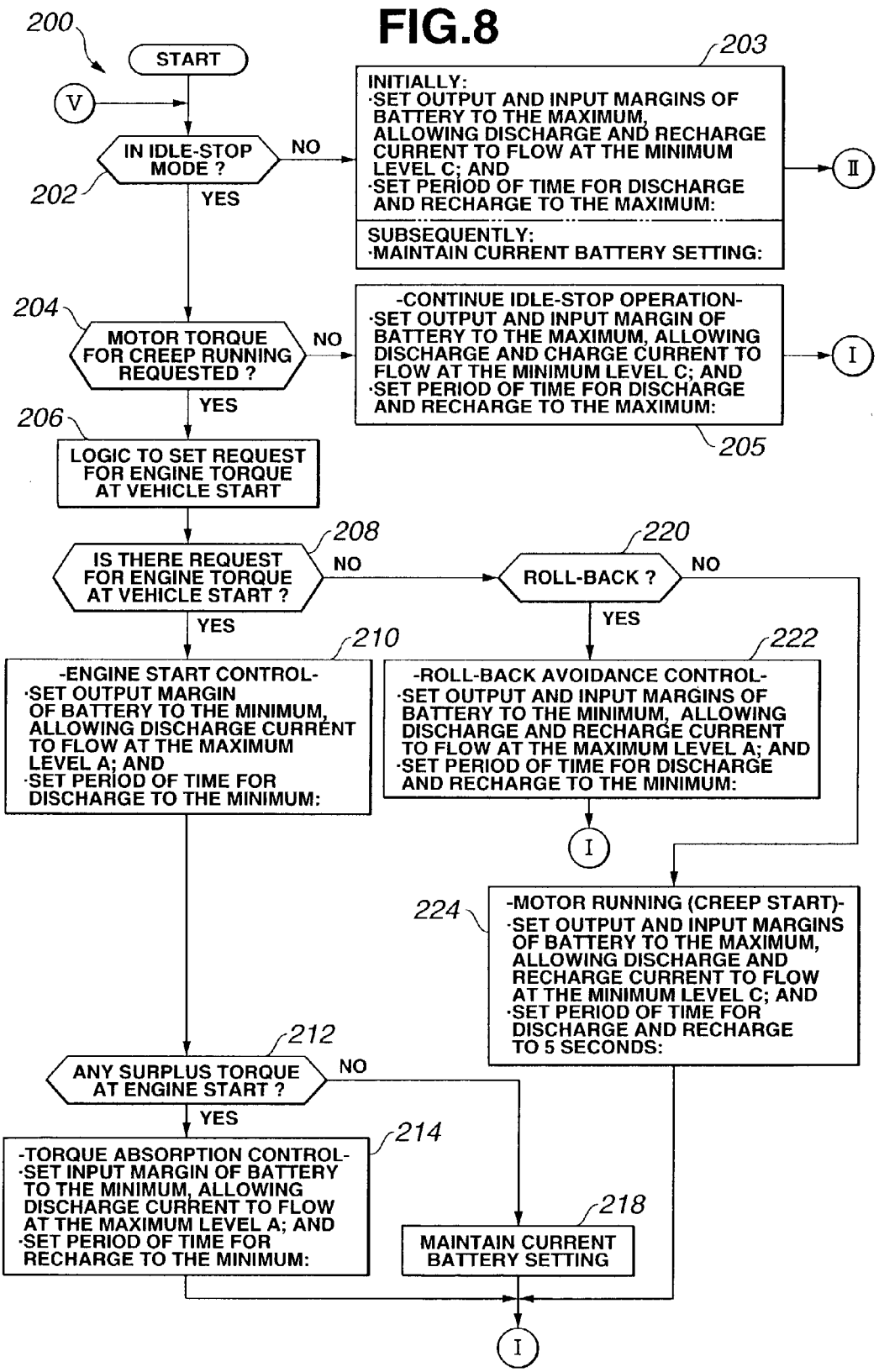
FIGS. 8 to 11, when combined, illustrate a flow diagram of a control routine of an exemplary implementation of the present invention.

In FIG. 8, at interrogation box 202, HCM 12 determines whether or not HEV 10 is in idle-stop mode. In idle-stop mode, engine 72 stops. If this is the case, the HCM determines, at interrogation box 204, whether or not there is a request for motor running (creep start), that is, whether or not, a motor torque is requested for creep running at vehicle start. If this is the case, the routine goes to box 206. At box 206, the HCM processes information as to the SOC of battery 70 and desired driving force in accordance with logic to determine that there is a request for engine torque at vehicle start. Specifically, the HCM determines whether or not the SOC of battery 70 is sufficiently high. If this is the case, the HCM determines whether or not the vehicle operator demands quick vehicle start by checking the accelerator pedal position or speed. If this is the case, the logic leads to a request for engine torque at vehicle start, invalidating the request for motor running (creep start). Otherwise, the logic confirms the validity of the request for motor running (creep start).

At the next interrogation box 208, the HCM determines whether or not there is the request for engine torque at vehicle start. If this is the case, the routine goes to box 210.

At box 210, the HCM provides battery setting in preparation for cranking engine 72 at start. With reference also to FIG. 3, in response to a request for engine start, the HCM sets, at box 210, an output margin $MG_O$ to the minimum level (MIN.) and a period of time $t_p$ to the minimum, for example, 1 second. Setting output margin $MG_O$ to the minimum allows discharge current to flow at the maximum level A. In other words, the allowance of battery 70 is at the maximum level A. According to this battery setting, the period of time $t_p$, which limits the flow of discharge current, is minimum, suppressing increase in consumption of electrical power. Subsequently after box 210, the routine goes to box 212.

At interrogation box 212, the HCM determines whether or not there is any surplus engine torque at engine start. If this is the case, the routine goes to box 214.

At box 214, the HCM provides battery setting in preparation for torque absorption of such surplus engine torque. For torque absorption, motor 74 operates as a generator to convert the surplus engine torque to electrical energy, supplying a great magnitude of current to recharge battery 70. With reference also to FIG. 5, in response to a request for torque absorption at engine start, the HCM sets, at box 214, an input margin $MG_I$ to the minimum level (MIN.) and the period of time $t_p$ to the minimum, for example, 1 second. Setting input margin $MG_I$ to the minimum allows recharge current to flow at the maximum level A, thus making it possible for battery 70 to receive such recharge current. In other words, the allowance of battery 70 is at the maximum level A. According to this battery setting, the period of time $t_p$, which limits the flow of recharge current, is minimum, suppressing overcharging of battery 70. Subsequently after box 214, the routine goes to a connector I.

If, at box 212, the HCM does not determine that there is any surplus torque at engine start, the routine goes to box 218. At box 218, the HCM maintains current battery setting established at box 210.

Turning back to box 208, if, at this box, the HCM does not determine that there is a request for engine torque at vehicle start, the routine goes to box 220. This is the case where the request for motor running (creep start) is validated. At interrogation box 220, the HCM determines whether or not HEV 10 is subject to "roll-back" phenomena. The HCM determines that the vehicle is subject to the roll-back based on the detection that the HEV is about to move, on an uphill road, as being pulled rearwards due to the gravitation or it is about to move, on a downhill road, as being pulled forwards due to the gravitation. If this is the case, the routine goes to box 222.

At box 222, the HCM provides battery setting in preparation for a request for motor action for roll-back avoidance (uphill) or a request for motor action for roll-back avoidance (downhill). With reference also to FIG. 3, in response to the request for motor action for roll-back avoidance (uphill), the HCM sets, at box 222, an output margin $MG_O$ to the minimum level (MIN.) and a period of time $t_p$ to the minimum, for example, 1 second in preparation for a need to supply a great magnitude of discharge current to motor 74. Setting output margin $MG_O$ to the minimum allows discharge current to flow at the maximum level A. In other words, the allowance of battery 70 is at the maximum level A. According to this battery setting, the period of time $t_p$, which limits the flow of discharge current, is minimum, suppressing increase in consumption of electrical power. With reference also to FIG. 5, in response to the request for motor action for roll-back avoidance (downhill), the HCM sets, at box 222, an input margin $MG_I$ to the minimum level (MIN.) and the period of time $t_p$ to the minimum, for example, 1 second in preparation for a need to receive a great magnitude of electrical current from motor 74 operating as a generator. Setting input margin $MG_I$ to the minimum allows recharge current to flow at the maximum level A. In other words, the allowance of battery 70 is at the maximum level A. According to this battery setting, the period of time $t_p$, which limits the flow of recharge current, is minimum, suppressing overcharging of battery 70. Subsequently after box 222, the routine goes to connector I.

Turning back to box 220, if, at this box, the HCM does not determine that HEV 10 is subject to roll-back, the routine goes to box 224.

At box 224, the HEV provides battery setting in preparation for a request for motor running (creep start) of motor 74 to apply creep torque at vehicle start. Vehicle start using motor creep is slow, requires only a small magnitude of discharge and recharge current between battery 70 and motor 74. With reference also to FIG. 3, the HCM sets output and input margins $MG_O$ and $MG_I$ to the maximum levels, respectively, and the period of time $t_p$ to 5 seconds, for example. Setting output and input margins $MG_O$ and $MG_I$ to the maximum allows discharge and recharge current to flow at the minimum level C. In other words, the allowance of battery 70 is at the minimum level C. Subsequently after box 224, the routine goes to connector I.

Turning back to box 204, if, at this box, HCM does not determine that there is a request for motor running (creep start). The routine goes to box 205.

At box 205, the HCM provides battery setting in preparation for continuos operation in idle-stop mode. At box 205, the HCM sets output and input margins $MG_O$ and $MG_I$ to the maximum levels, respectively, and the period of time $t_p$ to the maximum. Setting output and input margins $MG_O$ and $MG_I$ to the maximum allows discharge and recharge current to flow at the minimum level C. In other words, the allowance of battery 70 is at the minimum level C. Subsequently after box 205, the routine goes to connector I.

Turning back to box 202, if, at this box, the HCM does not determine that HEV 10 is in idle-stop mode, the routine goes to box 203.

At the initial processing loop, the HCM sets, at box 203, output and input margins $MG_O$ and $MG_I$ to the maximum levels, respectively, and the period of time $t_p$ to the maximum. Setting output and input margins $MG_O$ and $MG_I$ to the maximum allows discharge and recharge current to flow at the minimum level C. In other words, the allowance of battery 70 is at the minimum level C. However, at each of the next processing loop and onwards, the HCM maintains, at box 203, current battery setting. Subsequently after box 203, the routine goes to a connector II.

Figure 9:
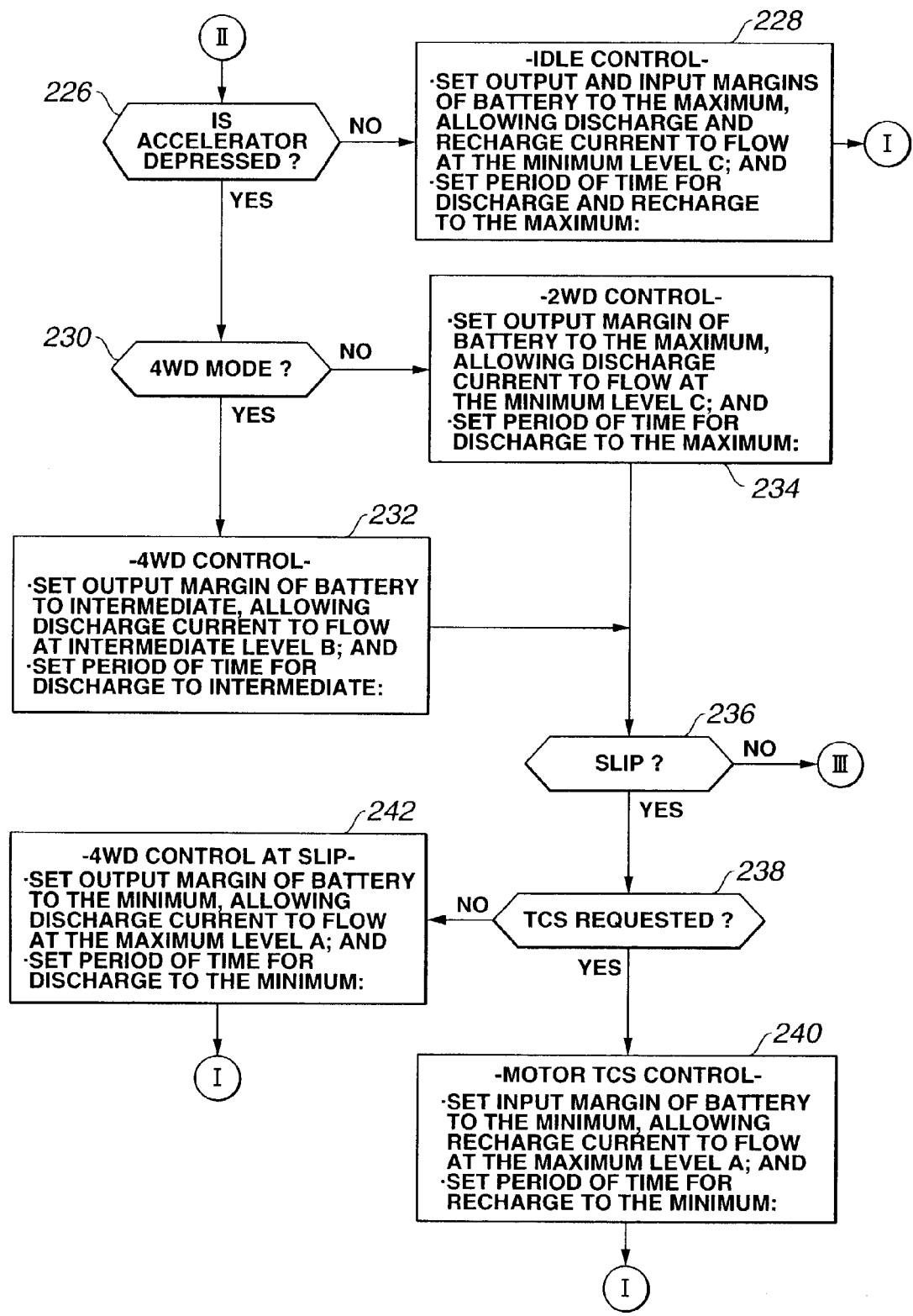

With reference now FIG. 9, the routine goes from connector II to box 226. At interrogation box 226, the HCM determines whether or not the accelerator pedal is depressed. If, at box 226, the HCM does not determine that the accelerator pedal is depressed, the routine goes to box 228.

At box 228, the HCM provides battery setting in preparation for idle speed control of engine 72. This is the case where the accelerator pedal is released when vehicle HEV is not in idle-stop mode. At box 228, the HCM sets output and input margins $MG_O$ and $MG_I$ to the maximum levels, respectively, and the period of time $t_p$ to the maximum. Setting output and input margins $MG_O$ and $MG_I$ to the maximum allows discharge and recharge current to flow at the minimum level C. In other words, the allowance of battery 70 is at the minimum level C, which level is appropriate in consideration of the magnitude of electrical current needed for idle speed control.

If, at box 226, the HCM determines that the accelerator pedal is depressed, the routine goes to box 230.

At interrogation 230, the HCM determines whether or not there is a request for 4WD start, that is, a request for 4 WD mode at vehicle start. If this is the case, the routine goes to box 232.

At box 232, the HCM provides battery setting in preparation for a request for 4WD start. To establish 4WD mode at vehicle start, battery 70 needs to discharge electrical current to drive motor 66. It is confirmed that the magnitude of discharge current required is intermediate between the maximum and minimum levels. With reference also to FIG. 3, the HCM sets, at box 232, an output margin $MG_O$ to an intermediate level (INT.) and the period of time $t_p$ to an intermediate level, for example, 3 seconds. Setting output margin $MG_O$ to the intermediate allows discharge current to flow at the intermediate level B. In other words, the allowance of battery 70 is at the intermediate level B. Subsequently after box 232, the routine goes to box 236.

If, at box 230, the HCM does not determine that there is a request for 4WD start, the routine goes to box 234. This is the case where there is a request for 2WD.

At box 234, the HCM provide battery setting in preparation for a request for 2WD control. In 2WD control, what is required on battery 70 is to supply electrical power high enough to drive motor 74 when a need arises for an assist by motor torque. The HCM sets, at box 234, output margin $MG_O$ to the maximum level, and the period of time $t_p$ to the maximum. Setting output margin $MG_O$ to the maximum allows discharge current to flow at the minimum level C. In other words, the allowance of battery 70 is at the minimum level C. Subsequently after box 234, the routine goes to box 236.

At interrogation box 236, the HCM determines whether or not there is a slip in road wheels 60 and 62 that are driven by engine 72. If this is the case, the routine goes to box 238.

At interrogation box 238, the HCM determines whether or not there is a request for activating a traction control system (TCS). According to TCS, motor 74 operates as generator to absorb a portion of engine driving force applied to road wheels 60 and 62 thereby to suppress a slip. If the HCM determines, at box 238, there is a request for activating TCS, the routine goes to box 240.

At box 240, the HCM provides battery setting in preparation for a request for motor TCS. With reference also to FIG. 5, in response to the request for motor TCS, the HCM sets input margin $MG_I$ to the minimum level (MIN.) and the period of time $t_p$ to the minimum, for example, 1 second. This battery setting is prepared for a need to receive a great magnitude of recharge current from motor 74 operating as a generator. Setting input margin $MG_I$ to the minimum allows recharge current to flow at the maximum level A. In other words, the allowance of battery 70 is at the maximum level A. According to this battery setting, the period of time $t_p$, which limits the flow of recharge current, is minimum, suppressing overcharging of battery 70. Subsequently after box 240, the routine goes to connector I.

If, at box 238, the HCM does not determine that there is a request for activating TCS, the routine goes to box 242. This is the case where a need arises to suppress a slip occurring in road wheels 60 and 62 by driving motor 66 to apply driving torque to road wheels 56 and 58.

At box 242, the HCM provides battery setting in preparation for a request for 4WD (slip), that is, a request for 4WD control at slip. With reference also to FIG. 3, the HCM sets, at box 242, output margin $MG_O$ to the minimum level, and the period of time $t_p$ to the minimum, for example, 1 second in preparation for a need to supply a great magnitude of discharge current to motor 66. Setting output margin $MG_O$ to the minimum allows discharge current to flow at the maximum level A. In other words, the allowance of battery 70 is at the maximum level A. According to this battery setting, the period of time $t_p$, which limits the flow of discharge current, is minimum, suppressing increase in consumption of electrical power. The setting of period of time $t_p$ to the minimum is long enough to suppress slip to regain traction of driving wheels 60 and 62 by driving motor 66.

Turning back to box 236, if, at this box, the HCM does not determine that there is a slip in road wheels 60 and 62, the routine goes to a connector III.

Figure 10:
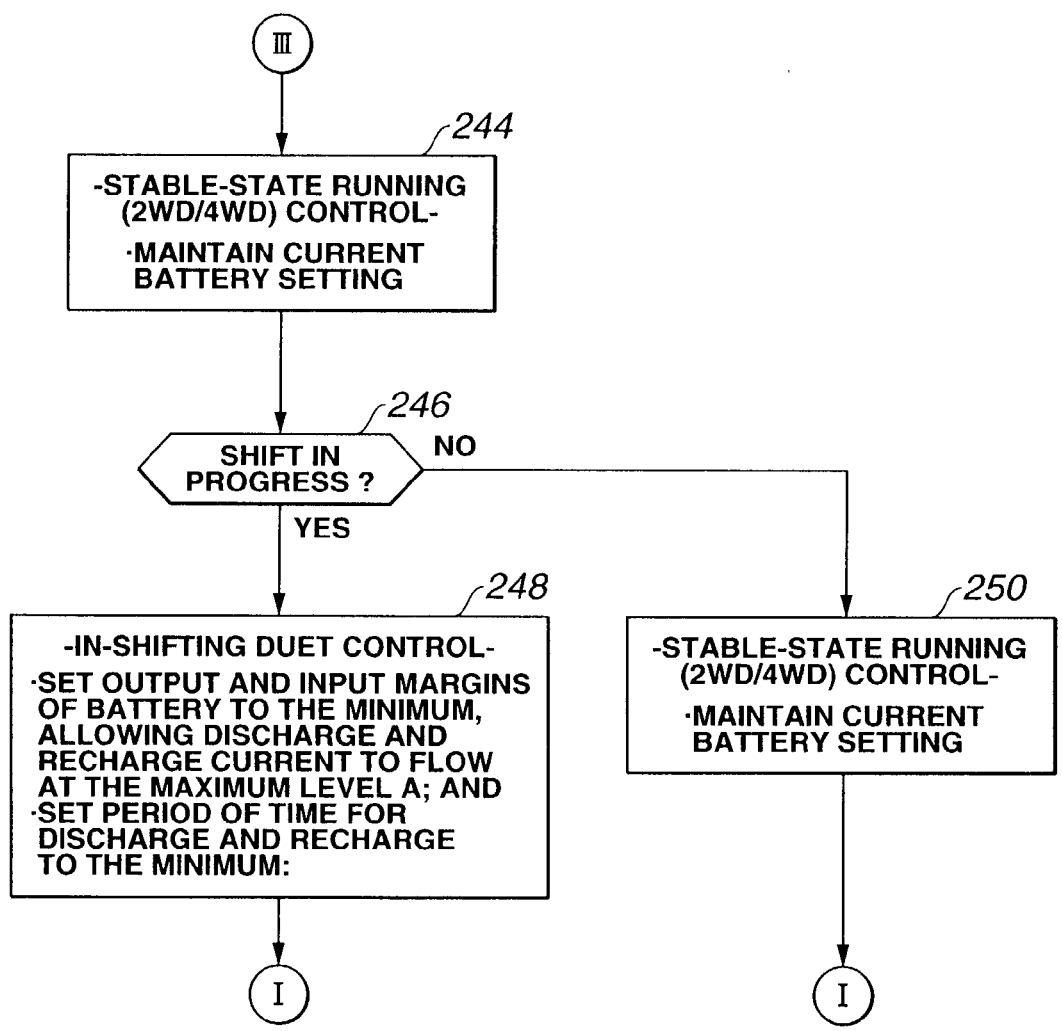

With reference now to FIG. 10, the routine goes from connector III to box 244. At box 244, the HCM maintains current battery setting. Subsequently after box 244, the routine goes to box 246.

At interrogation box 246, the HCM determines whether or not there is a ratio shift in progress within the associated transmission 112. If this is the case, the routine goes to block 248.

At block 248, the HCM provide battery setting in preparation for a request for duet control (shift down) or a request for duet control (shift up). According to the duet control for shift down, battery 70 supplies current to motor 74, adding torque, causing an increase in rotational speed of the engine output shaft. According to the duel control for shift up, motor 74 operates as a generator, absorbing torque, causing a reduction in rotational speed of the engine. With reference also to FIG. 3, in response to a request for duet control (shift down), the HCM sets, at box 248, an output margin $MG_O$ to the minimum level and a period of time $t_p$ to the minimum, for example, 1 second in preparation for a need to supply a great magnitude of discharge current to motor 74. Setting output margin $MG_O$ to the minimum allows discharge current to flow at the maximum level A. In other words, the allowance of battery 70 is at the maximum level A. According to this battery setting, the period of time $t_p$, which limits the flow of discharge current, is minimum, suppressing increase in consumption of electrical power. With reference also to FIG. 5, in response to a request for duet control (shift up), the HCM sets, at box 248, an input margin $MG_I$ to the minimum level and the period of time $t_p$ to the minimum, for example, 1 second in preparation for a need to receive a great magnitude of electrical current from motor 74 operating as a generator. Setting input margin $MG_I$ to the minimum allows recharge current to flow at the maximum level A. In other words, the allowance of battery 70 is at the maximum level A. According to this battery setting, the period of time $t_p$, which limits the flow of recharge current, is minimum, suppressing overcharging of battery 70. Subsequently after box 248, the routine goes to connector I.

If, at box 246, the HCM does not determine that there is a ratio shift in progress, the routine goes to box 250.

At box 250, the HCM maintains current battery setting. Subsequently after box 250, the routine goes to connector I.

Figure 11:
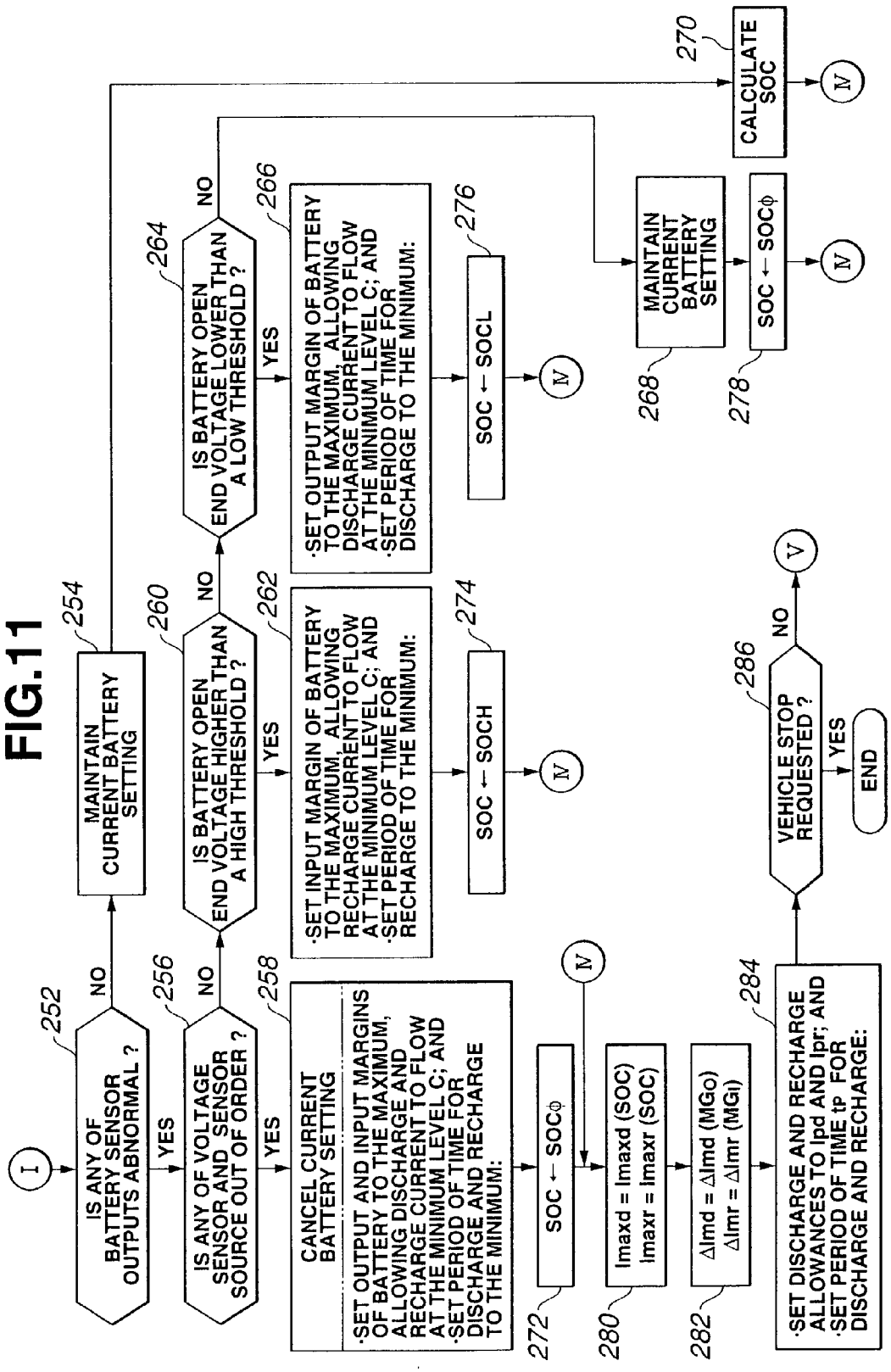

With reference now to FIG. 11, the routine goes from connector I to box 252.

At interrogation box 252, the HCM determines whether or not any of outputs of battery sensors is abnormal. The battery sensors include a voltage sensor and a current sensor. If the sensor outputs of both the voltage and current sensors are normal, the routine goes from box 252 to box 254. At box 254, the HCM maintains the current battery setting.

If, at box 252, the HCM determines that at least one of the sensor outputs is abnormal, the routine goes to box 256.

At interrogation box 256, the HCM determines whether or not any of voltage sensor and sensor source is out of order. If this is the case, the routine goes to box 258. This involves two cases, one in which the voltage sensor only is out of order, the other one in which the sensor source that provides electrical power to both voltage and current sensors is out of order, causing the voltage and current sensors to be inactive. Under this condition, the HCM cannot get information as to the actual SOC of battery 70. As the actual SOC is unknown, at box 258, the HCM cancels the current battery setting and provides battery setting to limit operation of battery 70. The HCM sets, at box 258, output and input margins $MG_O$ and $MG_I$ to the maximum levels, respectively, and the period of time $t_p$ to the minimum. Setting output and input margins $MG_O$ and $MG_I$ to the maximum levels, respectively, allows discharge and recharge current to flow at the minimum level C. In other words, the allowance of battery 70 for operation in discharge and recharge modes is at the minimum level C. Besides, the period of time $t_p$ that limits discharge and recharge current is minimum. The battery setting made at box 258 causes a reduction in the variation of actual SOC due to operation in discharge and recharge modes.

If, at box 256, the HCM does not determine that any of voltage sensor and sensor source is out of order, the routine goes to box 260. This is the case in which the current sensor only is out of order and both the voltage sensor and sensor source operate normally. Under this condition, as the current sensor cannot provide information as to current, the HCM cannot obtain accurate information as to the actual SOC of battery 70. However, the HCM can determine whether the actual SOC is excessively high or excessively low based on the battery open-end voltage indicated by the output of the voltage sensor.

At box 260, the HCM determines whether or not the battery open-end voltage is higher than a predetermined high voltage threshold. If this is the case, it may be determined that the actual SOC is sufficiently high and the routine goes to box 262.

At box 262, the HCM sets input margin $MG_I$ to the maximum level and the period of time $t_p$ to the minimum.

Setting input margin $MG_I$ to the maximum allows recharge current to flow at the minimum level C. In other words, the allowance of battery 70 is at the minimum level C. Besides, the period of time $t_p$ for recharge is the minimum. The battery setting made at box 262 causes a reduction in the variation of actual SOC due to operation in recharge mode, thus protecting battery against overcharging.

Turning back to box 260, if, at this box, the HCM does not determine the battery open-end voltage is higher than the predetermined high voltage threshold, the routine goes to box 264.

At interrogation box 264, the HCM determines whether or not the battery open-end voltage is lower than a predetermined low voltage threshold, which is lower than the predetermined high voltage threshold. If this is the case, the routine goes to box 266.

At box 266, the HCM sets output margin $MG_O$ to the maximum level and the period of time $t_p$ to the minimum.

Setting output margin $MG_O$ to the maximum allows discharge current to flow at the minimum level C. In other words, the allowance of battery 70 is at the minimum level C. Besides, the period of time $t_p$ for discharge is the minimum. The battery setting made at box 266 causes a reduction in the variation of actual SOC due to operation in discharge mode, thus protecting battery against over-consumption of electrical power.

Turning back to box 264, if, at this box, the HCM does not determine the battery open-end voltage is lower than the predetermined low voltage threshold, the routine goes to box 268. This is the case where the battery open-end voltage is not higher than the predetermined high voltage threshold and not lower than the predetermined low voltage threshold. At box 268, the HCM maintains the current battery setting.

With reference back to boxes 252 and 254, if both the voltage and current sensors are in good order, the routine goes from box 252 to box 254 and then to box 270. This is the case where the voltage and current signals may be used in calculation of the actual SOC. At box 270, the HCM calculates the actual SOC of battery 70. The actual SOC is calculated after decreasing, by the amount of discharge, and/or increasing, by the amount of recharge, an initial value of SOC. The initial value of SOC is determined from the output of voltage sensor when a relay disconnects battery 70 from a power supply circuit. The output of current sensor is used to determine the amount of discharge and the amount of recharge.

With reference back to boxes 252, 256 and 258, if both voltage and current sensors are out of order, the routine goes from box 252 to box 256 and then to box 258. After box 258, the routine goes to box 272. This is the case where calculation of SOC based on the outputs of voltage and current sensors is no longer possible. Under this condition, the HCM sets, at box 272, the actual SOC to a predetermined base level SOC0.

With reference back to boxes 252, 256 and 260, if the current sensor is out of order, but the voltage sensor is in good order, the routine goes from box 252 to box 256 and then to box 260. The output of voltage sensor is compared, at box 260, to the predetermined high voltage threshold and compared, at box 264, to the predetermined low voltage threshold. If the voltage is higher than the high voltage threshold, the HCM sets, at box 274, the actual SOC to a predetermined high level SOCH. If the voltage is lower than the low voltage threshold, the HCM sets, at box 276, the actual SOC a predetermined low level SOCL. If the voltage is not higher than the high voltage threshold and not lower than the low voltage threshold, the HCM sets, at box 278, the actual SOC to the base level SOC0. The relationship between the three levels is such that SOCH>SOC0>SOCL.

Subsequently after box 270 or 272 or 274 or 276 or 278, the routine goes to box 280.

At box 280, the HCM determines a discharge limit and a recharge limit using the actual SOC. The discharge limit is expressed in terms of a maximum magnitude of discharge current $I_{maxd}$ useable in discharge mode. The charge limit is expressed in terms of a maximum magnitude of recharge current $I_{maxr}$ usable in recharge mode. The HCM determines, at box 280, the maximum magnitudes of current $I_{maxd}$ and $I_{maxr}$ from the actual SOC. For example, a lookup table is used, which contains varying of $I_{maxd}$ with different levels of SOC, and another lookup table is used, which contains varying of $I_{maxr}$ with different levels of SOC.

Subsequently after box 280, the routine goes to box 282.

At box 282, the HCM determines a discharge clearance $\Delta I_{md}$ as a function of output margin $MG_O$, and a recharge clearance $\Delta I_{mr}$ as a function of input margin $MG_I$. Discharge clearance $\Delta I_{md}$ is a clearance to the maximum magnitude of discharge current $I_{maxd}$. Recharge clearance $\Delta I_{mr}$ is a clearance to the maximum magnitude of recharge current $I_{maxr}$. The functional relationship between discharge clearance $\Delta I_{md}$ and output margin $MG_O$ is a proportional relationship. The functional relationship between recharge clearance $\Delta I_{mr}$ and input margin $MG_I$ is a proportional relationship.

Subsequently after box 282, the routine goes to box 284.

At box 284, the HCM sets a discharge allowance $I_{pd}$ and a recharge allowance $I_{pr}$. Discharge and recharge allowances $I_{pd}$ and $I_{pr}$ are expressed as by the equations (1) and (2), respectively. The HCM sets, at box the period of time $t_p$ that has been contained in the battery setting made at box 254 or 258 or 262 or 266 or 268.

Subsequently after box 284, the routine goes to box 286.

At box 286, the HCM determines whether or not there is a request for vehicle stop. If this is the case, the routine comes to an end. If the HCM does not determine, at box 286, that there is a request for vehicle stop, the routine goes back to box 202 in FIG. 8.

From the preceding description, it will be appreciated that the control routine 200 is an exemplary software implementation of blocks 80, 90, 98, 100, 102 and 104 illustrated in FIG. 2.

While the present invention has been particularly described, in conjunction with exemplary embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese Patent Applications No. P2001-283805, filed Sep. 18, 2001, the disclosure of which is hereby incorporated by reference in its entirety.

What is claimed is:

1. A system for enhanced battery control that improves the performance of a hybrid electric vehicle, the hybrid electric vehicle including an internal combustion engine and at least one motor operable as a generator and a battery, the system comprising:
   a block determining various discharge and recharge allowances limiting operation of the battery with different operating conditions of the hybrid electric vehicle; and
   a block determining various periods of time limiting operation of the battery with different operating conditions of the hybrid electric vehicle.

2. A system for enhanced battery control that improves the performance of a hybrid electric vehicle, the hybrid electric vehicle including an internal combustion engine and at least one motor operable as a generator and a battery, the system comprising:
   a block determining various discharge and recharge allowances limiting operation of the battery with different operating conditions of the hybrid electric vehicle; and
   a block determining various periods of time limiting operation of the battery with different operating conditions of the hybrid electric vehicle,
   wherein the determined periods of time are related to the determined discharge and recharge allowances such that a shorter period of time is set for a greater allowance.

3. The system as claimed in claim 1, further comprising:
   a block estimating an actual state of charge (SOC) of the battery; and
   a block calculating a discharge limit of the battery and a recharge limit of the battery in response to the estimated actual SOC of the battery, the discharge and recharge limits being used as constraints in determining various discharge and recharge allowances and in determining various periods of time.

4. The system as claimed in claim 3, wherein the various discharge and recharge allowances are limited when no information is available which is needed to estimate the actual SOC of the battery.

5. A system for enhanced battery control that improves the performance of a hybrid electric vehicle, the hybrid electric vehicle including an internal combustion engine and at least one motor operable as a generator and a battery, the system comprising:
   a block determining various discharge and recharge allowances limiting operation of the battery with different operating conditions of the hybrid electric vehicle;
   a block determining various periods of time limiting operation of the battery with different operating conditions of the hybrid electric vehicle;
   a block estimating an actual state of charge (SOC) of the battery; and
   a block calculating a discharge limit of the battery and a recharge limit of the battery in response to the estimated actual SOC of the battery, the discharge and recharge limits being used as constraints in determining various discharge and recharge allowances and in determining various periods of time,
   wherein the various discharge and recharge allowances are determined based on open-end voltage of the battery when a measure of the open-end voltage is the only available information for estimating the actual SOC of the battery.

6. The system as claimed in claim 5, wherein, when the measure of the open-end voltage is higher than a predetermined high voltage threshold, a restricted recharge allowance is determined for different operating conditions of the hybrid electric vehicle, and, when the measure of the open-end voltage is lower than a predetermined low voltage threshold, a restricted discharge allowance is determined for different operating conditions of the hybrid electric vehicle.

7. The system as claimed in claim 1, wherein both the internal combustion engine and the at least one motor are coupled to all road wheels of the hybrid electric vehicle to apply driving torque thereto.

8. A system for enhanced battery control that improves the performance of a hybrid electric vehicle, the hybrid electric vehicle including an internal combustion engine and at least one motor operable as a generator and a battery, the system comprising:
   a block determining various discharge and recharge allowances limiting operation of the battery with different operating conditions of the hybrid electric vehicle; and
   a block determining various periods of time limiting operation of the battery with different operating conditions of the hybrid electric vehicle,
   wherein the maximum discharge allowance and the minimum period of time for discharge are determined in response to a request for engine start, a request for 4WD (slip), a request for duet control (shift down) and a request for motor action for roll-back avoidance (uphill); and wherein the minimum discharge allowance and the maximum period of time for discharge are determined in response to a request for torque assist by motor and a request for motor running (creep start); and wherein the intermediate discharge allowance and the intermediate period of time for discharge are determined in response to a request for 4WD start.

9. The system as claimed in claim 1, wherein the maximum recharge allowance and the minimum period of time for recharge are determined in response to a request for torque absorption at engine start, a request for motor TCS, a request for duet control (shift up) and a request for motor action for roll-back avoidance (downhill); and wherein the minimum recharge allowance and the maximum period of time for recharge are determined in response to a request for engine brake assist.

10. The system as claimed in claim 1, further comprising a device, within a passenger compartment of the hybrid electric vehicle, used to monitor the state of operation of the battery in relation to operating condition of the hybrid electric vehicle.

11. A system for enhanced battery control that improves the performance of a hybrid electric vehicle, the hybrid electric vehicle including an internal combustion engine and at least one motor operable as a generator and a battery, the system comprising:
   means for determining various discharge and recharge allowances limiting operation of the battery with different operating conditions of the hybrid electric vehicle; and
   means for determining various periods of time limiting operation of the battery with different operating conditions of the hybrid electric vehicle.

12. A method for enhanced battery control that improves the performance of a hybrid electric vehicle, the hybrid electric vehicle including an internal combustion engine and at least one motor operable as a generator and a battery, the method comprising:

determining various discharge and recharge allowances limiting operation of the battery with different operating conditions of the hybrid electric vehicle; and determining various periods of time limiting operation of the battery with different operating conditions of the hybrid electric vehicle.

13. A computer readable storage medium having stored therein data representing instructions executable by a computer for enhanced battery control that improves the performance of a hybrid electric vehicle, the hybrid electric vehicle including an internal combustion engine and at least one motor operable as a generator and a battery, the computer readable storage medium comprising:

instructions for determining various discharge and recharge allowances limiting operation of the battery with different operating conditions of the hybrid electric vehicle; and instructions for determining various periods of time limiting operation of the battery with different operating conditions of the hybrid electric vehicle.

14. A hybrid electric vehicle comprising:

an internal combustion engine;

at least one motor operable in response to motor commands, both the internal combustion engine and the motor being provided to apply driving torque to road wheels of the vehicle, the motor being operable as a generator;

a battery that is operable in discharge mode to energize the motor, the battery being operable in recharge mode when the motor operates as the generator;

a hybrid control module that is operable to determine different requests on the motor in response to varying operating conditions of the vehicle;

to determine torque application/absorption commands in response to the different requests;

to determine various output and input margins, and various periods of time with the different requests;

to determine discharge and recharge clearances in response to the determined various output and input margins;

to estimate an actual state of charge (SOC) of the battery;

to determine a discharge limit and a recharge limit in response to the estimated actual SOC of the battery;

to determine a discharge allowance from the determined discharge limit and the determined discharge clearance;

to determine a recharge allowance from the determined recharge limit and the determined recharge clearance;

to use the determined period of time, discharge allowance and recharge allowance as limits that are imposed on the torque application/absorption commands to generate the motor commands; and to apply the motor commands to the motor.

15. The system as claimed in claim 1, wherein the discharge allowances are related to operating conditions of the hybrid electric vehicle that reduce the charge of the battery, and wherein the recharge allowances are related to operating conditions of the hybrid electric vehicle that increase the charge of the battery.

16. The system as claimed in claim 2, wherein the discharge allowances are related to operating conditions of the hybrid electric vehicle that reduce the charge of the battery, and wherein the recharge allowances are related to operating conditions of the hybrid electric vehicle that increase the charge of the battery.

17. The system as claimed in claim 11, wherein the discharge allowances are related to operating conditions of the hybrid electric vehicle that reduce the charge of the battery, and wherein the recharge allowances are related to operating conditions of the hybrid electric vehicle that increase the charge of the battery.

18. The method as claimed in claim 12, wherein the discharge allowance are related to operating conditions of the hybrid electric vehicle that reduce the charge of the battery, and wherein the recharge allowances are related to operating conditions of the hybrid electric vehicle that increase the charge of the battery.

19. The storage medium of claim 13, wherein the discharge allowances are related to operating conditions of the hybrid electric vehicle that reduce the charge of the battery, and wherein the recharge allowances are related to operating conditions of the hybrid electric vehicle that increase the charge of the battery.

20. The vehicle of claim 14, wherein the discharge allowance is related to operating conditions of the hybrid electric vehicle that reduce the charge of the battery, and wherein the recharge allowance is related to operating conditions of the hybrid electric vehicle that increase the charge of the battery.

* * * * *